(12) United States Patent
Li et al.

(10) Patent No.: US 12,742,752 B2
(45) Date of Patent: Sep. 22, 2026

(54) ANALYSIS SYSTEM AND METHOD FOR IMPURITY COMPONENTS IN PERFLUOROPROPANE

(71) Applicant: LANSIS INSTRUMENT (SHANGHAI) CO., LTD, Shanghai (CN)

(72) Inventors: Chaoqing Li, Shanghai (CN); Fude Wang, Shanghai (CN); Jianhao Li, Shanghai (CN)

(73) Assignee: LANSIS INSTRUMENT (SHANGHAI) CO., LTD, Shanghai (CN)

( * ) Notice: Subject to any disclaimer, the term of this patent is extended or adjusted under 35 U.S.C. 154(b) by 0 days.

(21) Appl. No.: 18/697,262

(22) PCT Filed: Nov. 24, 2023

(86) PCT No.: PCT/CN2023/133818
§ 371 (c)(1),
(2) Date: Mar. 29, 2024

(87) PCT Pub. No.: WO2025/076930
PCT Pub. Date: Apr. 17, 2025

(65) Prior Publication Data

US 2026/0210916 A1 Jul. 23, 2026

(30) Foreign Application Priority Data

Oct. 12, 2023 (CN) ........................ 202311321638.0

(51) Int. Cl.
*G01N 30/32* (2006.01)
*B01D 53/02* (2006.01)
(Continued)

(52) U.S. Cl.
CPC ........... *G01N 30/32* (2013.01); *B01D 53/025* (2013.01); *G01N 30/62* (2013.01); *G01N 30/88* (2013.01);
(Continued)

(58) Field of Classification Search
CPC ........ G01N 30/32; G01N 30/62; G01N 30/88; G01N 2030/025; G01N 2030/328;
(Continued)

(56) References Cited

FOREIGN PATENT DOCUMENTS

| | | | | |
|---|---|---|---|---|
| CN | 111679025 A | * | 9/2020 | ............. G01N 30/88 |
| CN | 112578063 A | * | 3/2021 | ......... G01N 30/6043 |
| CN | 114609283 A | * | 6/2022 | ............. G01N 30/64 |

* cited by examiner

*Primary Examiner* — Benjamin R Schmitt
(74) *Attorney, Agent, or Firm* — Knobbe, Martens, Olson & Bear, LLP

(57) ABSTRACT

Disclosed are an analysis system and method for impurity components in perfluoropropane, belonging to the field of gas impurity detection. Each of a first sample loop, a second sample loop and a third sample loop is filled with a gas sample, and then the content of impurity components such as hydrogen, oxygen, argon, nitrogen, methane and carbon monoxide is detected using a first carrier gas, a first ten-way switching valve, a first gas separation device and a pulse discharge helium ionization detector. After a merged peak of hydrogen, oxygen, argon, nitrogen, methane and carbon monoxide firstly separated by a second gas separation device is emptied using a second carrier gas, a third carrier gas carries a carbon dioxide impurity component separated later for content detection, and a fourth carrier gas, after emptying non-fluorocarbon components firstly separated by a third gas separation device, carries fluorocarbon components separated later for content detection.

10 Claims, 4 Drawing Sheets

(51) Int. Cl.
*G01N 30/62* (2006.01)
*G01N 30/88* (2006.01)
*G01N 30/02* (2006.01)

(52) U.S. Cl.
CPC .. *B01D 2253/116* (2013.01); *B01D 2257/102* (2013.01); *B01D 2257/104* (2013.01); *B01D 2257/108* (2013.01); *B01D 2257/11* (2013.01); *B01D 2257/502* (2013.01); *B01D 2257/504* (2013.01); *B01D 2257/7025* (2013.01); *B01D 2259/40003* (2013.01); *G01N 2030/025* (2013.01); *G01N 2030/328* (2013.01); *G01N 2030/884* (2013.01)

(58) Field of Classification Search
CPC ............ G01N 2030/884; B01D 53/025; B01D 2253/116; B01D 2257/102; B01D 2257/104; B01D 2257/108; B01D 2257/11; B01D 2257/502; B01D 2257/504; B01D 2257/7025; B01D 2259/40003
See application file for complete search history.

ANALYSIS SYSTEM AND METHOD FOR IMPURITY COMPONENTS IN PERFLUOROPROPANE

CROSS-REFERENCE TO RELATED APPLICATION

This patent application is a national stage application of International Patent Application No. PCT/CN2023/133818, filed on Nov. 24, 2023, which claims the priority of Chinese Patent Application No. 202311321638.0 filed with the China National Intellectual Property Administration on Oct. 12, 2023, and entitled "Analysis system and method for impurity components in perfluoropropane", the entire content of which is incorporated by reference in the present application.

TECHNICAL FIELD

The present disclosure relates to the field of gas impurity detection, and in particular to an analysis system and method for impurity component in perfluoropropane.

BACKGROUND

At present, in GB/T31986-2015 Gas for electronic Industry—Perfluoropropane, it is stipulated that the purity volume fraction of perfluoropropane ($C_3F_8$) is greater than or equal to 99.999% (or 99.99%), and the content of impurity components in the perfluoropropane is from 0.1 μmol/mol to 5 μmol/mol (or 0.1 to 50 μmol/mol). Therefore, in order to meet the purity requirements of perfluoropropane, it is necessary to develop a system or method for detecting the content of impurity components at μmol/mol level.

SUMMARY

An objective of the present disclosure is to provide an analysis system and method for impurity component in perfluoropropane. Perfluoropropane, a main component, can be blown off by back-flushing, and the total analysis of the content of impurity components at μmol/mol level can be completed by one injection.

To achieve the objective above, the present disclosure employs the following technical solution:

An analysis system for impurity components in perfluoropropane is provided. The analysis system includes: a first ten-way switching valve, a first sample loop, a second ten-way switching valve, a second sample loop, a six-way switching valve, a third sample loop, a first gas separation device, a pulse discharge helium ionization detector, a second gas separation device, and a third gas separation device.

A first port of the first ten-way switching valve is a gas sample inlet, a tenth port of the first ten-way switching valve is connected to one end of the first sample loop, and a third port of the first ten-way switching valve is connected to the other end of the first sample loop. A first port of the second ten-way switching valve is connected to a second port of the first ten-way switching valve, a tenth port of the second ten-way switching valve is connected to one end of the second sample loop, and a third port of the second ten-way switching valve is connected to the other end of the second sample loop. A first port of the six-way switching valve is connected to a second port of the second ten-way switching valve, a sixth port of the six-way switching valve is connected to one end of the third sample loop, and a third port of the six-way switching valve is connected to the other end of the third sample loop. A gas sample is a perfluoropropane sample containing impurity components.

A fourth port of the first ten-way switching valve is a first carries gas inlet, one end of the first gas separation device is connected to a ninth port of the first ten-way switching valve, and the other end of the first gas separation device is connected to the pulse discharge helium ionization detector. The pulse discharge helium ionization detector is used to detect the content of impurity components such as hydrogen, oxygen, argon, nitrogen, methane and carbon monoxide separated by the first gas separation device from the gas sample.

A fourth port of the second ten-way switching valve is a second carrier gas inlet, and a seventh port of the second ten-way switching valve is a third carrier gas inlet. One end of the second gas separation device is connected to a ninth port of the second ten-way switching valve, and the other end of the second gas separation device is connected to the pulse discharge helium ionization detector. After a merged peak of hydrogen, oxygen, argon, nitrogen, methane and carbon monoxide firstly separated by the second gas separation device is emptied by a second carrier gas, a third carrier gas carries a carbon dioxide impurity component later separated by the second gas separation device to enter the pulse discharge helium ionization detector for content detection.

A fifth port of the six-way switching valve is a fourth carrier gas inlet, one end of the third gas separation device is connected to a fourth port of the six-way switching valve, and the other end of the third gas separation device is connected to the pulse discharge helium ionization detector. A fourth carrier gas, after emptying non-fluorocarbon components firstly separated by the third gas separation device, carries fluorocarbon components later separated by the third gas separation device to enter the pulse discharge helium ionization detector for content detection. The fluorocarbon components include carbon tetrafluoride, hexafluoroethane, hexafluoropropylene, heptafluoropropane, and perfluorocyclobutane.

An analysis method for impurity components in perfluoropropane includes the following steps:

a gas sample connection phase:

setting interface states of a first ten-way switching valve and a second ten-way switching valve to a first connection mode, and setting an interface state of a six-way switching valve to a first connection state, where the first connection mode is that a first port of the ten-way switching valve communicates with a tenth port, a second port communicates with a third port, a fourth port communicates a fifth port, a sixth port communicates with a seventh port, and an eighth port communicates with a ninth port; the first connection state of the sixth-way switching valve is that a first port of the six-way switching valve communicates with a sixth port, a second port communicates with a third port, and a fourth port communicates with a fifth port;

introducing a gas sample from the first port of the first ten-way switching valve, and making a first sample loop, a second sample loop and a third sample loop filled with the same amount of gas sample, respectively, where the gas sample is a perfluoropropane gas sample including impurity components;

a hydrogen, oxygen, argon, nitrogen, methane and carbon monoxide component detection phase:

switching the interface state of the first ten-way switching valve to a second connection mode, where the second connection mode is that the first port of the ten-way switching valve communicates with the second port, the third port communicates with the fourth port, the fifth port communicates with the sixth port, the seventh port communicates with the eighth port, and the ninth port communicates with the tenth port;

introducing a first carrier gas from the fourth port of the first ten-way switching valve, enabling the first carrier gas to carry the gas sample in the first sample loop to enter a first gas separation device, and after impurity components such as hydrogen, oxygen, argon, nitrogen, methane and carbon monoxide are separated by the first gas separation device, enabling the gas sample to enter a pulse discharge helium ionization detector for content detection;

a carbon dioxide component detection phase:

switching the interface state of the second ten-way switching valve to a second connection mode;

introducing a second carrier gas from the fourth port of the second ten-way switching valve, enabling the second carrier gas to carry the gas sample in the second sample loop to enter a second gas separation device, and after a merged peak of hydrogen, oxygen, argon, nitrogen, methane and carbon monoxide firstly separated by the second gas separation device is emptied, switching the interface state of the second ten-way switching valve to the first connection mode;

introducing a third carrier gas from the seventh port of the second ten-way switching valve, and enabling the third carrier gas to carry a carbon dioxide impurity component later separated by the second gas separation device to enter the pulse discharge helium ionization detector for content detection; and a fluorocarbon component detection phase:

switching the interface state of the six-way switching valve to a second connection mode, wherein the second connection mode is that the first port of the six-way switching valve communicates with the second port, the third port communicates with the fourth port, and the fifth port communicates with the sixth port;

introducing a fourth carrier gas from the fifth port of the six-way switching valve, enabling the fourth carrier gas to carry the gas sample in the third sample loop to enter a third gas separation device, and after non-fluorocarbon components firstly separated by the third gas separation device are emptied, switching the interface state of the six-way switching valve to the first connection mode; and enabling the fourth carrier gas to carry fluorocarbon components later separated by the third gas separation device to enter the pulse discharge helium ionization detector for content detection, wherein the fluorocarbon components comprise carbon tetrafluoride, hexafluoroethane, hexafluoropropylene, heptafluoropropane and perfluorocyclobutane.

According to specific embodiments of the present disclosure, the present disclosure has the following technical effects:

According to an analysis system and method for impurity components in perfluoropropane disclosed by the present disclosure, each of a first sample loop, a second sample loop and a third sample loop is filled with the gas sample, and then the content of impurity components such as hydrogen, oxygen, argon, nitrogen, methane and carbon monoxide is detected using a first carrier gas, a first ten-way switching valve, a first gas separation device and a pulse discharge helium ionization detector. After a merged peak of hydrogen, oxygen, argon, nitrogen, methane and carbon monoxide firstly separated by a second gas separation device is emptied using a second carrier gas, a third carrier gas carries a carbon dioxide impurity component later separated by the second gas separation device to enter a pulse discharge helium ionization detector for content detection, and a fourth carrier gas, after emptying non-fluorocarbon components firstly separated by a third gas separation device, carries fluorocarbon components later separated by the third gas separation device to enter the pulse discharge helium ionization detector for content detection. Perfluoropropane, a main component, can be blown off by back-flushing, and the total analysis of the content of impurity components at μmol/mol level can be completed by one injection.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
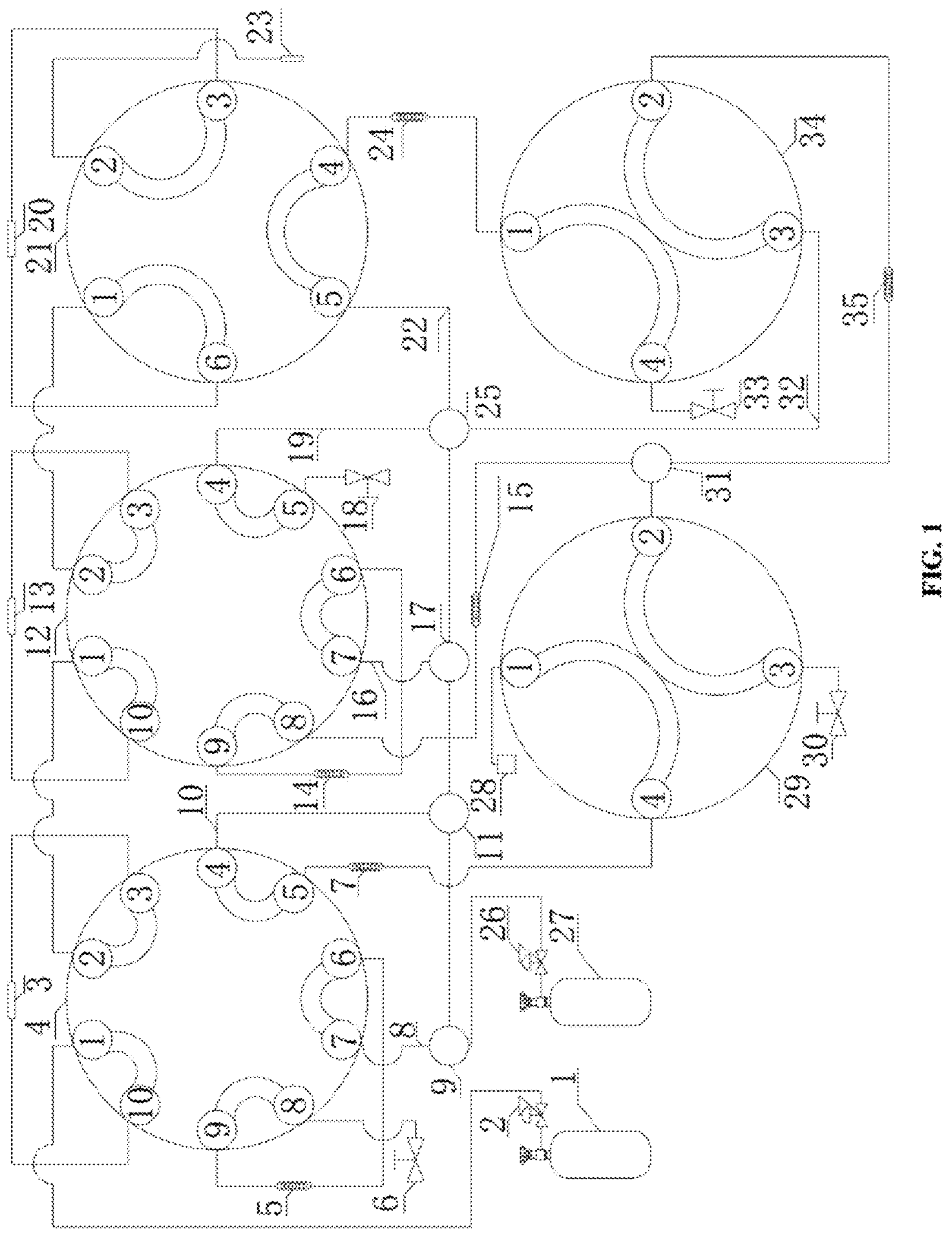
FIG. 1 is a connection schematic diagram of an analysis system for impurity components in perfluoropropane according to an embodiment of the present disclosure in a gas sample collection phase.

In the drawings: 1—sample storage tank; 2—first pressure relief valve; 3—first sample loop; 4—first ten-way switching valve; 5—first polymer chromatographic column; 6—first needle valve; 7—molecular sieve chromatographic column; 8—fifth carrier gas pipeline; 9—second planar tee; 10—first carrier gas pipeline; 11—third planar tee; 12—second ten-way switching valve; 13—second sample loop; 14—second polymer chromatographic column; 15—third polymer chromatographic column; 16—third carrier gas pipeline; 17—fourth planar tee; 18—second needle valve; 19—second carrier gas pipeline; 20—third sample loop; 21—six-way switching valve; 22—fourth carrier gas pipeline; 23—metering device; 24—first capillary chromatographic column; 25—planar cross; 26—second pressure relief valve; 27—carrier gas device; 28—pulse discharge helium ionization detector; 29—second four-way switching valve; 30—third needle valve; 31—first planar tee; 32—sixth carrier gas pipeline; 33—fourth needle valve; 34—first four-way switching valve; 25—second capillary chromatographic column.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

In order to make the objectives, technical solutions and advantages of the present disclosure more clearly, the present disclosure is further described in detail below with reference to the embodiments.

As shown in FIG. 1, an analysis system for impurity components in perfluoropropane is provided by an embodiment of the present disclosure, including a first ten-way switching valve 4, a first sample loop 3, a second ten-way switching valve 12, a second sample loop 13, a six-way switching valve 21, a third sample loop 20, a first gas separation device, a pulse discharge helium ionization detector 28, a second gas separation device, and a third gas separation device.

A first port of the first ten-way switching valve 4 is a gas sample inlet, a tenth port of the first ten-way switching valve 4 is connected to one end of the first sample loop 3, and a third port of the first ten-way switching valve 4 is connected to the other end of the first sample loop 3. A first port of the second ten-way switching valve 12 is connected to a second port of the first ten-way switching valve 4, a tenth port of the second ten-way switching valve 12 is connected to one end of the second sample loop 13, and a third port of the second ten-way switching valve 12 is connected to the other end of the second sample loop 13. A first port of the six-way switching valve 21 is connected to a second port of the second ten-way switching valve 12, a sixth port of the six-way switching valve 21 is connected to one end of the third sample loop 20, and a third port of the six-way switching valve 21 is connected to the other end of the third sample loop 20. A gas sample is a perfluoropropane sample containing impurity components.

A fourth port of the first ten-way switching valve 4 is a first carries gas inlet, one end of the first gas separation device is connected to a ninth port of the first ten-way switching valve 4, and the other end of the first gas separation device is connected to the pulse discharge helium ionization detector 28. The pulse discharge helium ionization detector 28 is used to detect the content of impurity components such as hydrogen, oxygen, argon, nitrogen, methane and carbon monoxide separated by the first gas separation device from the gas sample.

A fourth port of the second ten-way switching valve 12 is a second carrier gas inlet, and a seventh port of the second ten-way switching valve 12 is a third carrier gas inlet. One end of the second gas separation device is connected to a ninth port of the second ten-way switching valve 12, and the other end of the second gas separation device is connected to the pulse discharge helium ionization detector 28. After a merged peak of hydrogen, oxygen, argon, nitrogen, methane and carbon monoxide firstly separated by the second gas separation device is emptied by a second carrier gas, a third carrier gas carries a carbon dioxide impurity component later separated by the second gas separation device to enter the pulse discharge helium ionization detector 28 for content detection.

A fifth port of the six-way switching valve 21 is a fourth carrier gas inlet, one end of the third gas separation device is connected to a fourth port of the six-way switching valve 21, and the other end of the third gas separation device is connected to the pulse discharge helium ionization detector 28. A fourth carrier gas, after emptying non-fluorocarbon components firstly separated by the third gas separation device, carries fluorocarbon components later separated by the third gas separation device to enter the pulse discharge helium ionization detector 28 for content detection. The fluorocarbon components include carbon tetrafluoride, hexafluoroethane, hexafluoropropylene, heptafluoropropane, and perfluorocyclobutane.

In an example, the first gas separation device includes a first polymer chromatographic column 5, and a molecular sieve chromatographic column 7.

One end of the first polymer chromatographic column 5 is connected to the ninth port of the first ten-way switching valve 4, and the other end of the first polymer chromatographic column 5 is connected to a sixth port of the first ten-way switching valve 4. The first polymer chromatographic column 5 is used to separate the merged peak of hydrogen, oxygen, argon, nitrogen, methane and carbon monoxide and a merged peak of components other than hydrogen, oxygen, argon, nitrogen, methane and carbon monoxide from a gas sample in sequence. One end of the molecular sieve chromatographic column 7 is connected to a fifth port of the first ten-way switching valve 4, and the other end of the molecular sieve chromatographic column 7 is connected to the pulse discharge helium ionization detector 28. The molecular sieve chromatographic column 7 is used to separate the merged peak of hydrogen, oxygen, argon, nitrogen, methane and carbon monoxide into hydrogen, oxygen, argon, nitrogen, methane and carbon monoxide.

In another example, the second gas separation device includes a second polymer chromatographic column 14, and a third polymer chromatographic column 15.

One end of the second polymer chromatographic column 14 is connected to a ninth port of the second ten-way switching valve 12, and the other end of the second polymer chromatographic column 14 is connected to a sixth port of the second ten-way switching valve 12. The second polymer chromatographic column 14 is used to separating the merged peak of hydrogen, oxygen, argon, nitrogen, methane and carbon monoxide, a carbon dioxide component and heavy components from the gas sample in sequence. One end of the third polymer chromatographic column 15 is connected to an eighth port of the second ten-way switching valve 12, and the other end of the third polymer chromatographic column 15 is connected to the pulse discharge helium ionization detector 28. The third polymer chromatographic column 15 is used to further separate carbon dioxide from the carbon dioxide component.

In still another example, the third gas separation device includes a first capillary chromatographic column 24, a second capillary chromatographic column 35, and a first four-way switching valve 34.

One end of the first capillary chromatographic column 24 is connected to a fourth port of the six-way switching valve 21, and the other end of the first capillary chromatographic column 24 is connected to a first port of the first four-way switching valve 34. One end of the second capillary chromatographic column 35 is connected to a second port of the first four-way switching valve 34, and the other end of the second capillary chromatographic column 35 is connected to the pulse discharge helium ionization detector 28. The first capillary chromatographic column 24 is used to separate non-fluorocarbon components and fluorocarbon components from the gas sample in sequence. The first four-way switching valve 34 is used to communicate the first port with the fourth port to completely empty the non-fluorocarbon components, and then is switched to communicate the first port with a second port to transmit the fluorocarbon components to the second capillary chromatographic column 35. The second capillary chromatographic column 35 is used to separate the fluorocarbon components into carbon tetrafluoride, hexafluoroethane, hexafluoropropylene, heptafluoropropane, and perfluorocyclobutane.

The molecular sieve chromatographic column 7 is filled with a 5A chromatographic support or other equivalent chromatographic supports.

Each of the first polymer chromatographic column 5, the second polymer chromatographic column 14 and the third polymer chromatographic column 15 is filled with porapak Q chromatographic support or other equivalent chromatographic supports.

The first capillary chromatographic column 24 and the second capillary chromatographic column 35 are Gas-pro capillary columns or other equivalent chromatographic columns.

Referring to FIG. 1, the analysis system further includes: a second four-way switching valve 29, and a first planar tee 31.

The other end of the first gas separation device is connected to a fourth port of the second four-way switching valve 29, and a first port of the second four-way switching valve 29 is connected to the pulse discharge helium ionization detector 28. A first interface of the first planar tee 31 is connected to a second port of the second four-way switching valve 29, a second interface of the first planar tee 31 is connected to the other end of the second gas separation device, and a third interface of the first planar tee 31 is connected to the other end of the third gas separation device.

Further, the analysis system further includes: a first needle 6, a second needle valve 18, a third needle valve 30, and a fourth needle valve 33. The first needle valve 6 is connected to an eighth port of the first ten-way switching valve 4. The second needle valve 18 is connected to a fifth port of the second ten-way switching valve 12. The third needle valve 30 is connected to a third port of the second four-way switching valve 29. The fourth needle valve 33 is connected to a fourth port of the first four-way switching valve 34.

The analysis system further includes: a sample storage tank 1, a first pressure relief valve 2, and a metering device 23. A gas output end of the sample storage tank 1 is connected to the first port of the first ten-way switching valve 4 by means of the first pressure relief valve 2, and the metering device 23 is connected to a second port of the six-way switching valve 21. The gas sample stored in the sample storage tank 1, after being depressurized by the first pressure relief valve 2, flows through the first ten-way switching valve 4, the first sample loop 3, the second ten-way switching valve 12, the second sample loop 13, the six-way switching valve 21, the third sample loop 20 and the metering device 23 in sequence, thus making each of the first sample loop 3, the second sample loop 13 and the third sample loop 20 filled with the gas sample with a preset flow rate or preset pressure.

The metering device 23 is a flowmeter, or a pressure sensor.

The analysis system further includes a carrier gas device 27, a second pressure relief valve 26, a second planar tee 9, a third planar tee 11, a fourth planar tee 17, and a planar cross 25.

The carrier gas device 27 is connected to a first interface of the second planar tee 9 by means of the second pressure relief valve 26, a second interface of the second planar tee 9 is connected to a seventh port of the first ten-way switching valve 4, and a third interface of the second planar tee 9 is connected to a first interface of the third planar tee 11. A second interface of the third planar tee 11 is connected to the fourth port of the first ten-way switching valve 4, and a third interface of the third planar tee 11 is connected to a first interface of the fourth planar tee 17. A second interface of the fourth planar tee 17 is connected to the seventh port of the second ten-way switching valve 12, and a third interface of the fourth planar tee 17 is connected to a first interface of the planar cross 25. A second interface of the planar cross 25 is connected to the fourth port of the second four-way switching valve 12, a third interface of the planar cross 25 is connected to the fifth port of the six-way switching valve 21, and a fourth interface of the planar cross 25 is connected to a third port of the first four-way switching valve 34.

The basic principle of an analysis system for impurity components in perfluoropropane provided by the embodiments of the present disclosure is as follows:

A carrier gas flowing process is as follows:

A carrier gas, after flowing out from a carrier gas device 27, is depressurized by a second pressure relief valve 26, and flows to a first needle valve 6 after flowing through a first interface of a second planar tee 9, a fifth carrier gas pipeline 8, a seventh port of a first ten-way switching valve 4, a sixth port of the first ten-way switching valve 4, a first polymer chromatographic column 5, a ninth port of the first ten-way switching valve 4 and an eighth port of the first ten-way switching valve 4.

The carrier gas flows out from a second interface of the second planar tee 9, and flows to a pulse discharge helium ionization detector 28 after flowing through a first interface of a third planar tee 11, a first carrier gas pipeline 10, a fourth port of the first ten-way switching valve 4, a fifth port of the first ten-way switching valve 4, a molecular sieve chromatographic column 7, a fourth port of a second four-way switching valve 29 and a first port of the second four-way switching valve 29.

The carrier gas flows out from a second interface of the third planar tee 11, and flows to a third needle valve 30 after flowing through a first interface of a fourth planar tee 17, a third carrier gas pipeline 16, a seventh port of the second ten-way switching valve 12, a sixth port of the second ten-way switching valve 12, a second polymer chromatographic column 14, a ninth port of the second ten-way switching valve 12, an eighth port of the second ten-way switching valve 12, a third polymer chromatographic column 15, one interface of a first planar tee 31, a second port of the second four-way switching valve 29 and a third port of the second four-way switching valve 29.

The carrier gas flows out from a third interface of the fourth planar tee 17, and flows to a second needle valve 18 after flowing through a first interface of a planar cross 25→a second carrier gas pipeline 19, a fourth port of the second ten-way switching valve 12 and a fifth port of the second ten-way switching valve 12.

The carrier gas flows out from a third interface of the planar cross 25, and flows to a fourth needle valve 33 after flowing through a fourth carrier gas pipeline 22, a fifth port of a six-way switching valve 21, a fourth port of the six-way switching valve 21, a first capillary chromatographic column 24, a first port of a first four-way switching valve 34 and a fourth port of the first four-way switching valve 34.

The carrier gas flows out from a fourth interface of the planar cross 25, and flows to one interface of the first planar tee 31 after flowing through a sixth carrier gas pipeline 32, a third port of the first four-way switching valve 34, a second port of the first four-way switching valve 34 and a second capillary chromatographic column 35.

A sampling process is as follows:

A sample, after flowing out from a sample storage tank 1, is depressurized by a first pressure relief valve 2, and flows to a flowmeter or a pressure sensor after flowing through a first port of the first ten-way switching valve 4, a tenth port of the first ten-way switching valve 4, a first sample loop 3, a third port of the first ten-way switching valve 4, a second port of the first ten-way switching valve 4, a first port of the second ten-way switching valve 12, a tenth port of the second ten-way switching valve 12, a second sample loop 13, a third port of the second ten-way switching valve 12, a second port of the second ten-way switching valve 12, a first port of the six-way switching valve 21, a sixth port of the six-way switching valve 21, a third sample loop 20, a third port of the six-way switching valve 21, and a second port of the six-way switching valve 21.

Figure 2:
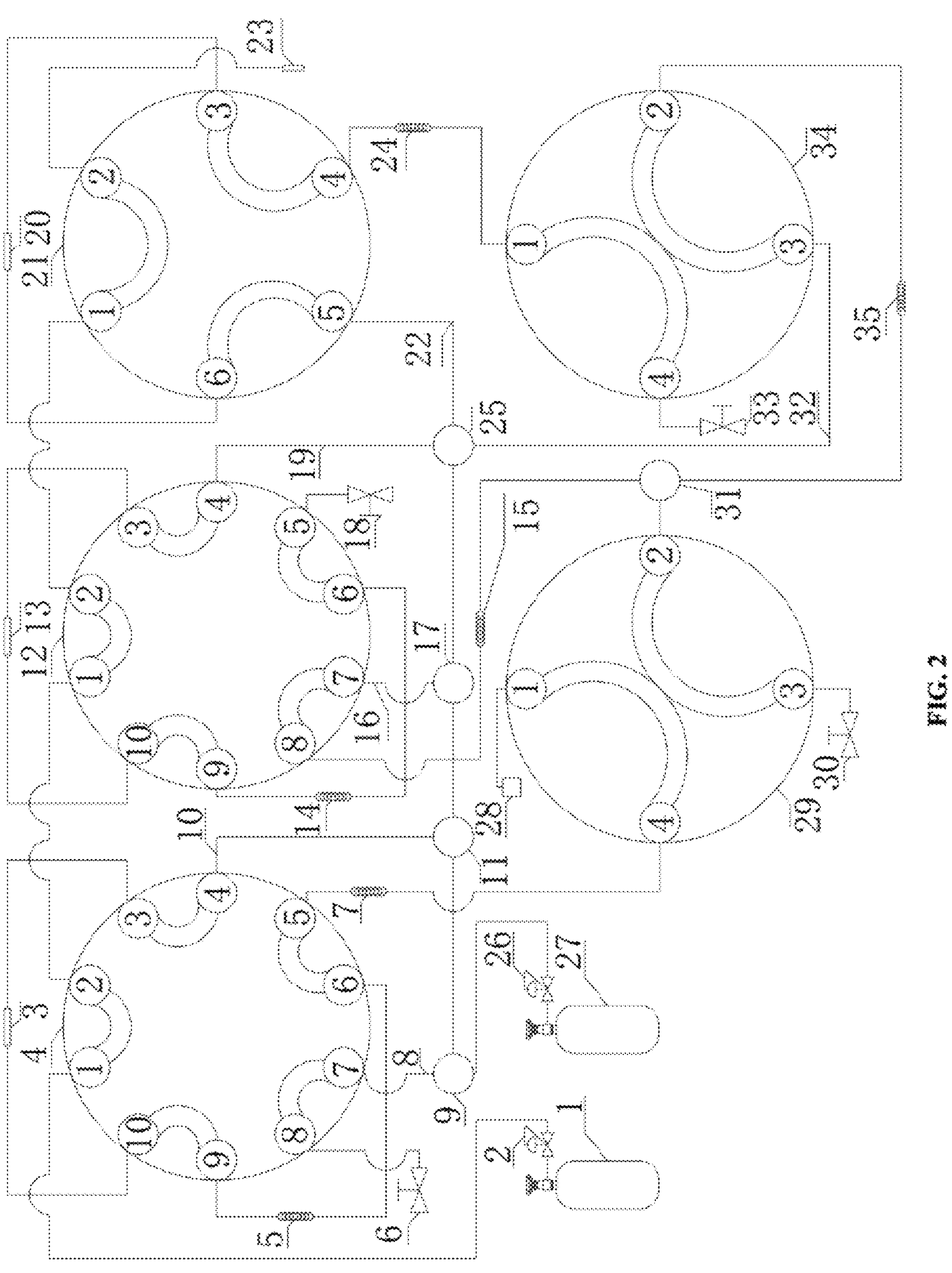
FIG. 2 is a connection schematic diagram of an analysis system for impurity components in perfluoropropane according to an embodiment of the present disclosure in a hydrogen, oxygen, argon, nitrogen, methane and carbon monoxide component detection phase.

An analysis and detection process includes:

A Hydrogen, Oxygen, Argon, Nitrogen, Methane and Carbon Monoxide Component Analysis and Detection Process As shown in FIG. 2, a first carrier gas carries a sample in the first sample loop 3 to enter the first polymer chromatographic column 5, and the sample is pre-separated into a merged peak of hydrogen, oxygen, argon, nitrogen, methane and carbon monoxide and a combined peak of components other than hydrogen, oxygen, argon, nitrogen, methane and carbon monoxide. When the merged peak of hydrogen, oxygen, argon, nitrogen, methane and carbon monoxide completely enters the molecular sieve chromatographic column 7 from the first polymer chromatographic column 5, the first ten-way switching valve 4 is reset to a state shown in FIG. 1, the merged peak of hydrogen, oxygen, argon, nitrogen, methane and carbon monoxide is further separated into hydrogen, oxygen, argon, nitrogen, methane and carbon monoxide components by the molecular sieve chromatographic column 7, and the merged peak of components other than hydrogen, oxygen, argon, nitrogen, methane and carbon monoxide is subjected by back-flushing by a fifth carrier gas, so as to be released by the first needle valve 6.

A Carbon Dioxide Component Analysis and Detection Process

As shown in FIG. 2, a second carrier gas carries a sample in the second sample loop 13 to enter the second polymer chromatographic column 14, and the sample is pre-separated into light components (e.g., hydrogen, oxygen, argon, nitrogen), a carbon dioxide component, and heavy components (hydrocarbons above C2, etc.).

Figure 3:
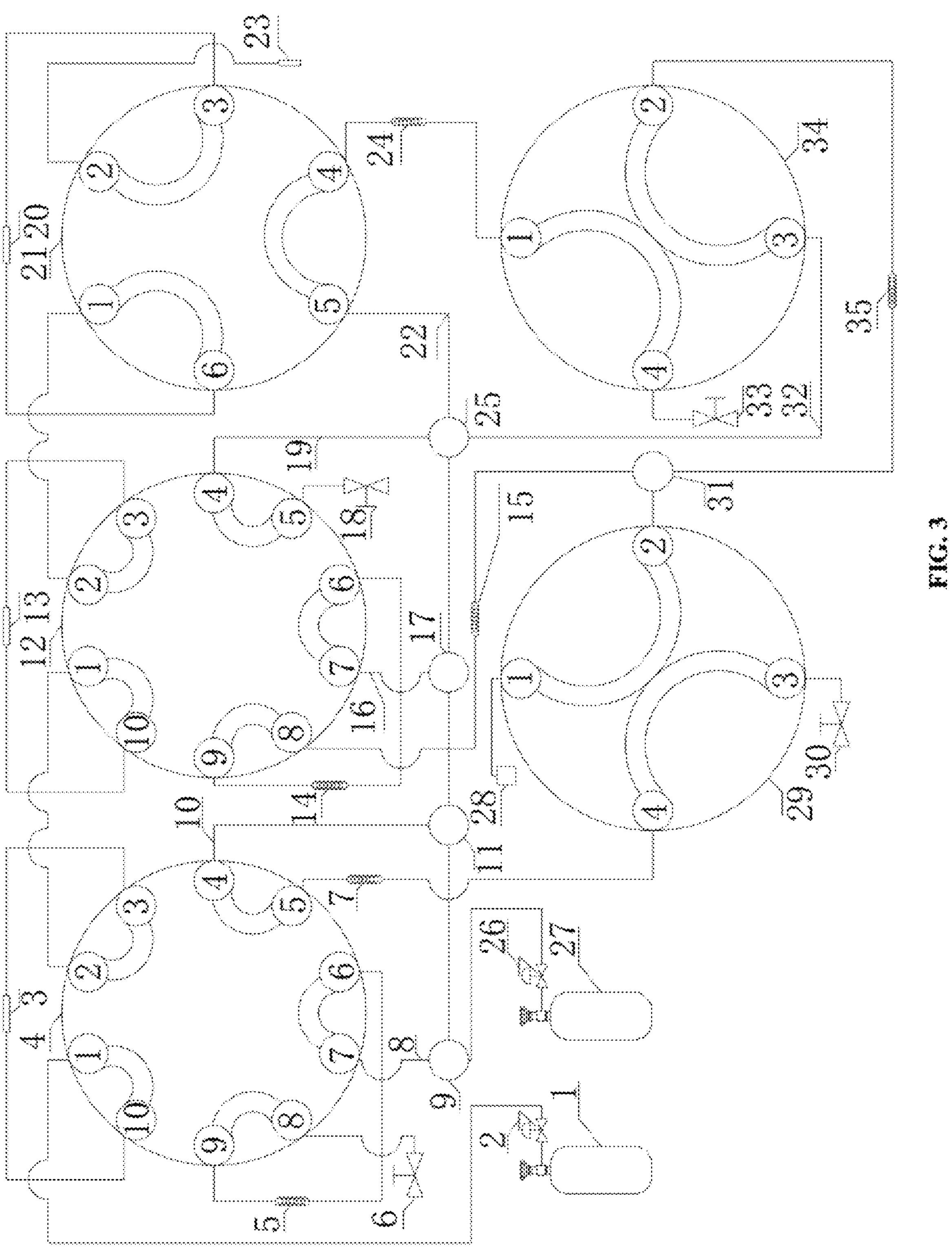
FIG. 3 is a connection schematic diagram of an analysis system for impurity components in perfluoropropane according to an embodiment of the present disclosure in a carbon dioxide component detection phase.

When the light components (e.g., hydrogen, oxygen, argon, nitrogen) are completely released by the second needle valve 18, the second ten-way switching valve 12 is switched to a state shown in FIG. 3, a third carrier gas carries the carbon dioxide component in the second polymer chromatographic column 14 to enter the third polymer chromatographic column 15, and the carbon dioxide component is further separated into the carbon dioxide component to be detected by the pulse discharge helium ionization detector 28. When the carbon dioxide component completely enters the third polymer chromatographic column 15, the second four-way switching valve 29 is switched to a state shown in FIG. 2, and the third carrier gas carries the heavy components in the third polymer chromatographic column 15 to be released by the third needle valve 30.

A Fluorocarbon Component Analysis and Detection Process

Figure 4:
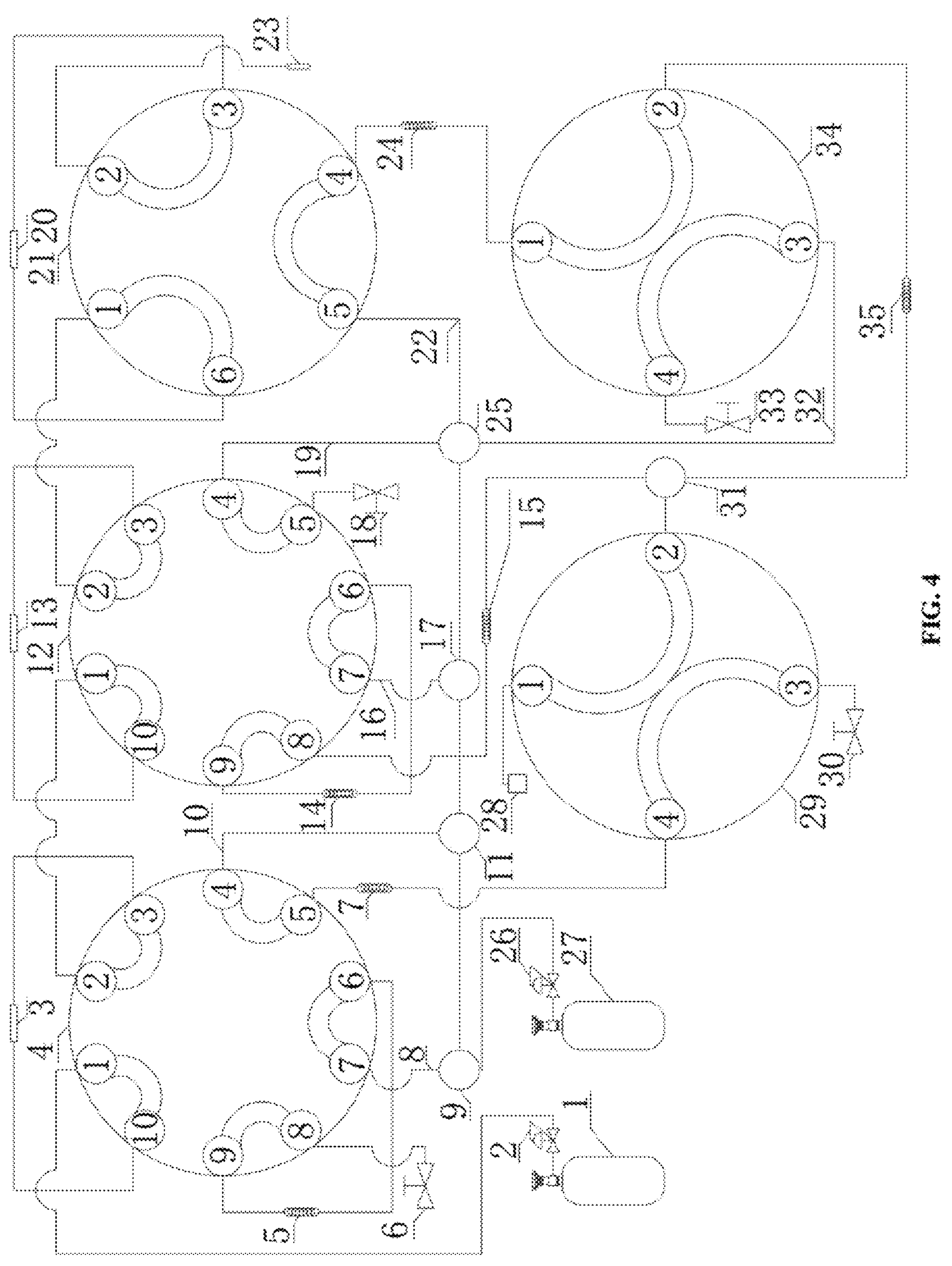
FIG. 4 is a connection schematic diagram of an analysis system for impurity components in perfluoropropane according to an embodiment of the present disclosure in a fluorocarbon component detection phase.

As shown in FIG. 2, a fourth carrier gas carries a sample in the third sample loop 20 to enter a pre-analysis first capillary chromatographic column 24, the sample is separated into non-fluorocarbon components and fluorocarbon components. When the non-fluorocarbon components are completely released by the fourth needle valve 33, the first four-way switching valve 34 is switched to a state shown in FIG. 4. The fluorocarbon components are further separated into carbon tetrafluoride, hexafluoroethane, hexafluoropropylene, heptafluoropropane and perfluorocyclobutane components by the second capillary chromatographic column 35, and are detected by the pulse discharge helium ionization detector 28.

According to the analysis system for impurity components in perfluoropropane provided by the present disclosure, perfluoropropane ($C_3F_8$), a main component, can be blown off by back-flushing using a heart cutting analysis system, so as to detect the content of impurity components at μmol/mol level.

An analysis method for impurity components in perfluoropropane is further provided by the embodiment of the present disclosure, including the following steps:

A Gas Sample Collection Phase

Interface states of a first ten-way switching valve 4 and a second ten-way switching valve 12 are both set to a first connection mode, and an interface state of a six-way switching valve 21 is set to a first connection state. The first connection mode is that a first port of the ten-way switching valve communicates with a tenth port, a second port communicates with a third port, a fourth port communicates a fifth port, a sixth port communicates with a seventh port, and an eighth port communicates with a ninth port. The first connection state of the sixth-way switching valve 21 is that a first port communicates with a sixth port, a second port communicates with a third port, and a fourth port communicates with a fifth port.

A gas sample is introduced from the first port of the first ten-way switching valve 4, making a first sample loop 3, a second sample loop 13 and a third sample loop 20 filled with the same amount of gas sample, respectively, where the gas sample is a perfluoropropane gas sample containing impurity components.

A Hydrogen, Oxygen, Argon, Nitrogen, Methane and Carbon Monoxide Component Detection Phase The interface state of the first ten-way switching valve 4 is switched to a second connection mode, the second connection mode of the ten-way switching valve is that the first port communicates with the second port, the third port communicates with the fourth port, the fifth port communicates with the sixth port, the seventh port communicates with the eighth port, and the ninth port communicates with the tenth port.

A first carrier gas is introduced from the fourth port of the first ten-way switching valve 4, the first carrier gas carries the gas sample in the first sample loop 3 to enter a first gas separation device, and after impurity components such as hydrogen, oxygen, argon, nitrogen, methane and carbon monoxide are separated by the first gas separation device, the gas sample enters a pulse discharge helium ionization detector 28 for content detection.

A Carbon Dioxide Component Detection Phase

The interface state of the second ten-way switching valve 12 is switched to a second connection mode, the second connection mode of the ten-way switching valve is that the first port communicates with the second port, the third port communicates with the fourth port, the fifth port communicates with the sixth port, the seventh port communicates with the eighth port, and the ninth port communicates with the tenth port.

A second carrier gas is introduced from the fourth port of the second ten-way switching valve 12, the second carrier gas carries the gas sample in the second sample loop 13 to enter a second gas separation device, and after a merged peak of hydrogen, oxygen, argon, nitrogen, methane and carbon monoxide firstly separated by the second gas separation device is emptied, the interface state of the second ten-way switching valve 12 is switched to the first connection mode.

A third carrier gas from the seventh port of the second ten-way switching valve 12, the third carrier gas carries a carbon dioxide impurity component later separated by the second gas separation device to enter the pulse discharge helium ionization detector 28 for content detection.

A Fluorocarbon Component Detection Phase

The interface state of the six-way switching valve 21 is switched to a second connection mode, the second connection mode of the six-way switching valve 21 is that the first port communicates with the second port, the third port communicates with the fourth port, and the fifth port communicates with the sixth port.

A fourth carrier gas is introduced from the fifth port of the six-way switching valve 21, the fourth carrier gas carries the gas sample in the third sample loop 20 to enter a third gas separation device, and after non-fluorocarbon components firstly separated by the third gas separation device is emptied, the interface state of the six-way switching valve 21 is switched to the first connection mode.

The fourth carrier gas carries the fluorocarbon components later separated by the third gas separation device to enter the pulse discharge helium ionization detector 28 for content detection. The fluorocarbon components include carbon tetrafluoride, hexafluoroethane, hexafluoropropylene, heptafluoropropane and perfluorocyclobutane.

There is no restriction on the detection sequence of the hydrogen, oxygen, argon, nitrogen, methane and carbon monoxide component detection phase, the carbon dioxide component detection phase and the fluorocarbon component detection phase, which may be conducted at the same time or in sequence.

According to the analysis system for impurity components in perfluoropropane provided by the embodiment of the present disclosure, an analysis method for impurity components in perfluoropropane can be conducted, and the detailed operation process of the analysis system for impurity components in perfluoropropane when executing the method can be seen in the introduction of sampling process and analysis and detection process.

The embodiments in this specification are all described in a progressive manner, each embodiment focuses on a difference from other embodiments, and for same or similar parts in the embodiments, reference may be made to these embodiments. As the method disclosed by the embodiments corresponds to the system disclosed by the embodiments, the method is described in a relatively simple manner embodiment is basically similar to the method embodiment, and therefore is described in a relatively simple manner. For related parts, reference can be made to part of the description of the method.

Specific examples are used herein for illustration of the principles and implementation methods of the present disclosure. The description of the embodiments is merely used to help illustrate the method and its core principles of the present disclosure. In addition, a person of ordinary skill in the art can make various modifications in terms of specific embodiments and scope of application in accordance with the teachings of the present disclosure. In conclusion, the content of this specification shall not be construed as a limitation to the present disclosure.

What is claimed is:

1. An analysis system for impurity components in perfluoropropane, wherein the analysis system comprises: a first ten-way switching valve, a first sample loop, a second ten-way switching valve, a second sample loop, a six-way switching valve, a third sample loop, a first gas separation device, a pulse discharge helium ionization detector, a second gas separation device, and a third gas separation device;

a first port of the first ten-way switching valve is a gas sample inlet, a tenth port of the first ten-way switching valve is connected to one end of the first sample loop, and a third port of the first ten-way switching valve is connected to the other end of the first sample loop; a first port of the second ten-way switching valve is connected to a second port of the first ten-way switching valve, a tenth port of the second ten-way switching valve is connected to one end of the second sample loop, and a third port of the second ten-way switching valve is connected to the other end of the second sample loop; a first port of the six-way switching valve is connected to a second port of the second ten-way switching valve, a sixth port of the six-way switching valve is connected to one end of the third sample loop, and a third port of the six-way switching valve is connected to the other end of the third sample loop; a gas sample is a perfluoropropane sample comprising impurity components;

a fourth port of the first ten-way switching valve is a first carrier gas inlet, one end of the first gas separation device is connected to a ninth port of the first ten-way switching valve, and the other end of the first gas separation device is connected to the pulse discharge helium ionization detector; the pulse discharge helium ionization detector is used to detect the content of impurity components which comprise at least one of hydrogen, oxygen, argon, nitrogen, methane or carbon monoxide separated by the first gas separation device from the gas sample;

a fourth port of the second ten-way switching valve is a second carrier gas inlet, and a seventh port of the second ten-way switching valve is a third carrier gas inlet; one end of the second gas separation device is connected to a ninth port of the second ten-way switching valve, and the other end of the second gas separation device is connected to the pulse discharge helium ionization detector; after a merged peak of hydrogen, oxygen, argon, nitrogen, methane and carbon monoxide firstly separated by the second gas separation device is emptied by a second carrier gas, a third carrier gas carries a carbon dioxide impurity component later separated by the second gas separation device to enter the pulse discharge helium ionization detector for content detection;

a fifth port of the six-way switching valve is a fourth carrier gas inlet, one end of the third gas separation device is connected to a fourth port of the six-way switching valve, and the other end of the third gas separation device is connected to the pulse discharge helium ionization detector; a fourth carrier gas, after emptying non-fluorocarbon components firstly separated by the third gas separation device, carries fluorocarbon components later separated by the third gas separation device to enter the pulse discharge helium ionization detector for content detection; the fluorocarbon components comprise carbon tetrafluoride, hexafluoroethane, hexafluoropropylene, heptafluoropropane, and perfluorocyclobutane.

2. The analysis system for impurity components in perfluoropropane according to claim 1, wherein the first gas separation device comprises: a first polymer chromatographic column, and a molecular sieve chromatographic column;

one end of the first polymer chromatographic column is connected to the ninth port of the first ten-way switching valve, and the other end of the first polymer chromatographic column is connected to a sixth port of the first ten-way switching valve; the first polymer chromatographic column is used to separate the merged peak of hydrogen, oxygen, argon, nitrogen, methane and carbon monoxide and a merged peak of components other than hydrogen, oxygen, argon, nitrogen, methane and carbon monoxide from a gas sample in sequence;

one end of the molecular sieve chromatographic column is connected to a fifth port of the first ten-way switching valve, and the other end of the molecular sieve chromatographic column is connected to the pulse discharge helium ionization detector; and the molecular sieve chromatographic column is used to separate the merged peak of hydrogen, oxygen, argon, nitrogen, methane and carbon monoxide into hydrogen, oxygen, argon, nitrogen, methane and carbon monoxide.

3. The analysis system for impurity components in perfluoropropane according to claim 1, wherein the second gas separation device comprises: a second polymer chromatographic column, and a third polymer chromatographic column;

one end of the second polymer chromatographic column is connected to a ninth port of the second ten-way switching valve, and the other end of the second polymer chromatographic column is connected to a sixth port of the second ten-way switching valve; the second polymer chromatographic column is used to separating the merged peak of hydrogen, oxygen, argon, nitrogen, methane and carbon monoxide, a carbon dioxide component and heavy components from the gas sample in sequence;

one end of the third polymer chromatographic column is connected to an eighth port of the second ten-way switching valve, and the other end of the third polymer chromatographic column is connected to the pulse discharge helium ionization detector; and the third polymer chromatographic column is used to further separate carbon dioxide from the carbon dioxide component.

4. The analysis system for impurity components in perfluoropropane according to claim 1, wherein the third gas separation device comprises: a first capillary chromatographic column, a second capillary chromatographic column, and a first four-way switching valve;

one end of the first capillary chromatographic column is connected to a fourth port of the six-way switching valve, and the other end of the first capillary chromatographic column is connected to a first port of the first four-way switching valve; one end of the second capillary chromatographic column is connected to a second port of the first four-way switching valve, and the other end of the second capillary chromatographic column is connected to the pulse discharge helium ionization detector;

the first capillary chromatographic column is used to separate non-fluorocarbon components and fluorocarbon components from the gas sample in sequence; the first four-way switching valve is used to communicate the first port with the fourth port to completely empty the non-fluorocarbon components, and then is switched to communicate the first port with a second port to transmit the fluorocarbon components to the second capillary chromatographic column; the second capillary chromatographic column is used to separate the fluorocarbon components into carbon tetrafluoride, hexafluoroethane, hexafluoropropylene, heptafluoropropane, and perfluorocyclobutane.

5. The analysis system for impurity components in perfluoropropane according to claim 4, wherein the analysis system further comprises: a second four-way switching valve, and a first planar tee;

the other end of the first gas separation device is connected to a fourth port of the second four-way switching valve, and a first port of the second four-way switching valve is connected to the pulse discharge helium ionization detector;

a first interface of the first planar tee is connected to a second port of the second four-way switching valve, a second interface of the first planar tee is connected to the other end of the second gas separation device, and a third interface of the first planar tee is connected to the other end of the third gas separation device.

6. The analysis system for impurity components in perfluoropropane according to claim 5, wherein the analysis system further comprises: a first needle valve, a second needle valve, a third needle valve, and a fourth needle valve;

the first needle valve is connected to an eighth port of the first ten-way switching valve;

the second needle valve is connected to a fifth port of the second ten-way switching valve;

the third needle valve is connected to a third port of the second four-way switching valve; and the fourth needle valve is connected to a fourth port of the first four-way switching valve.

7. The analysis system for impurity components in perfluoropropane according to claim 4, wherein the analysis system further comprises: a carrier gas device, a second pressure relief valve, a second planar tee, a third planar tee, a fourth planar tee, and a planar cross;

the carrier gas device is connected to a first interface of the second planar tee by means of the second pressure relief valve, a second interface of the second planar tee is connected to a seventh port of the first ten-way switching valve, and a third interface of the second planar tee is connected to a first interface of the third planar tee;

a second interface of the third planar tee is connected to the fourth port of the first ten-way switching valve, and a third interface of the third planar tee is connected to a first interface of the fourth planar tee;

a second interface of the fourth planar tee is connected to the seventh port of the second ten-way switching valve, and a third interface of the fourth planar tee is connected to a first interface of the planar cross;

a second interface of the planar cross is connected to the fourth port of the second four-way switching valve, a third interface of the planar cross is connected to the fifth port of the six-way switching valve, and a fourth interface of the planar cross is connected to a third port of the first four-way switching valve.

8. The analysis system for impurity components in perfluoropropane according to claim 1, wherein the analysis system further comprises: a sample storage tank, a first pressure relief valve, and a metering device;

a gas output end of the sample storage tank is connected to the first port of the first ten-way switching valve by means of the first pressure relief valve, and the metering device is connected to a second port of the six-way switching valve;

the gas sample stored in the sample storage tank, after being depressurized by the first pressure relief valve, flows through the first ten-way switching valve, the first sample loop, the second ten-way switching valve, the second sample loop, the six-way switching valve, the third sample loop and the metering device in sequence, thus making each of the first sample loop, the second sample loop and the third sample loop filled with the gas sample with a preset flow rate or preset pressure.

9. The analysis system for impurity components in perfluoropropane according to claim 8, wherein the metering device is a flowmeter, or a pressure sensor.

10. An analysis system for impurity components in perfluoropropane, comprising the following steps:

a gas sample connection phase:

setting interface states of a first ten-way switching valve and a second ten-way switching valve to a first connection mode, and setting an interface state of a six-way switching valve to a first connection state, wherein the first connection mode is that a first port of the ten-way switching valve communicates with a tenth port, a second port communicates with a third port, a fourth port communicates a fifth port, a sixth port communicates with a seventh port, and an eighth port communicates with a ninth port; the first connection state of the sixth-way switching valve is that a first port of the six-way switching valve communicates with a sixth port, a second port communicates with a third port, and a fourth port communicates with a fifth port;

introducing a gas sample from the first port of the first ten-way switching valve, and making a first sample loop, a second sample loop and a third sample loop filled with the same amount of gas sample, respectively, wherein the gas sample is a perfluoropropane gas sample comprising impurity components;

a hydrogen, oxygen, argon, nitrogen, methane and carbon monoxide component detection phase:

switching the interface state of the first ten-way switching valve to a second connection mode, wherein the second connection mode is that the first port of the ten-way switching valve communicates with the second port, the third port communicates with the fourth port, the fifth port communicates with the sixth port, the seventh port communicates with the eighth port, and the ninth port communicates with the tenth port;

introducing a first carrier gas from the fourth port of the first ten-way switching valve, enabling the first carrier gas to carry the gas sample in the first sample loop to enter a first gas separation device, and after impurity components which comprise at least one of hydrogen, oxygen, argon, nitrogen, methane or carbon monoxide are separated by the first gas separation device, enabling the gas sample to enter a pulse discharge helium ionization detector for content detection;

a carbon dioxide component detection phase:

switching the interface state of the second ten-way switching valve to a second connection mode;

introducing a second carrier gas from the fourth port of the second ten-way switching valve, enabling the second carrier gas to carry the gas sample in the second sample loop to enter a second gas separation device, and after a merged peak of hydrogen, oxygen, argon, nitrogen, methane and carbon monoxide firstly separated by the second gas separation device is emptied, switching the interface state of the second ten-way switching valve to the first connection mode;

introducing a third carrier gas from the seventh port of the second ten-way switching valve, and enabling the third carrier gas to carry a carbon dioxide impurity component later separated by the second gas separation device to enter the pulse discharge helium ionization detector for content detection; and a fluorocarbon component detection phase:

switching the interface state of the six-way switching valve to a second connection mode, wherein the second connection mode is that the first port of the six-way switching valve communicates with the second port, the third port communicates with the fourth port, and the fifth port communicates with the sixth port;

introducing a fourth carrier gas from the fifth port of the six-way switching valve, enabling the fourth carrier gas to carry the gas sample in the third sample loop to enter a third gas separation device, and after non-fluorocarbon components firstly separated by the third gas separation device are emptied, switching the interface state of the six-way switching valve to the first connection mode; and enabling the fourth carrier gas to carry fluorocarbon components later separated by the third gas separation device to enter the pulse discharge helium ionization detector for content detection, wherein the fluorocarbon components comprise carbon tetrafluoride, hexafluoroethane, hexafluoropropylene, heptafluoropropane and perfluorocyclobutane.

* * * * *